INVENTORS
NORIO TSUBOUCHI
MASAO TAKAHASHI
TOMEJI OHNO
TSUNEO AKASHI

United States Patent Office 3,518,199
Patented June 30, 1970

3,518,199
PIEZOELECTRIC CERAMICS
Norio Tsubouchi, Masao Takahashi, Tomeji Ohno, and Tsuneo Akashi, Tokyo, Japan, assignors to Nippon Electric Company, Limited, Tokyo, Japan
Continuation-in-part of application Ser. No. 684,788, Nov. 21, 1967. This application July 10, 1969, Ser. No. 840,630
Claims priority, application Japan, Nov. 26, 1966, 41/77,371, 41/46,787; Dec. 29, 1966, 42/973, 42/46,788
Int. Cl. C04b 35/00, 35/46; H01v 7/02
U.S. Cl. 252—62.9                                9 Claims

ABSTRACT OF THE DISCLOSURE

A piezoelectric ceramic is disclosed consisting essentially of a solid solution of the three components $$Pb(Fe_{1/3}Z_{2/3})O_3$$

$PbTiO_3$ and $PbZrO_3$, wherein Z represents one element selected from the group consisting of Nb and Sb. Up to about 25 atom percent of Pb may be replaced by at least one element selected from the group consisting of Ba, Sr and Ca. The ceramic may have incorporated in it about 0.1 to 3.0 weight percent of MnO.

---

This application is a continuation-in-part of application Ser. No. 684,788, filed Nov. 21, 1967, now abandoned.

This invention relates to piezoelectric materials and, more particularly, to novel piezoelectric ceramics having excellent properties suitable for use in various fields.

One of the typical fields of application of piezoelectric materials is in the manufacture of transducers for transmitting and receiving ultrasonic waves. In such use, the electromechanical coupling factor is very important for evaluating in practice the properties of piezoelectric materials to be used. The electromechanical coupling factor is a representative of the efficiency of transforming the electric oscillation into mechanical vibration and of conversely transforming the mechanical vibration into electrical oscillation, a high value thereof generally indicating better efficiency of interconversion and being particularly desirable for piezoelectric materials to be used in the manufacture of transducers.

Other important fundamental factors to be considered in evaluating piezoelectric materials are the dielectric loss, the dielectric constant and the mechanical quality factor. With regard to piezoelectric materials employed in transducers, it is preferred that the dielectric loss be small. The desirable value of the dielectric constant is large or small depending on electric loads, the mechanical quality factor being not so important.

The above subject matter is described in detail in, for example, D. Berlincourt et al., "Transducer Properties of Lead Titanate Zirconate Ceramics," IRE Transactions on Ultrasonic Engineering, February 1960, pp. 1–6 and R.C.V. Macario, "Design Data for Band-Pass Ladder Filters Employing Ceramic Resonators," Electronic Engineering, vol. 33, No. 3, (1961) pp. 171–177.

Another typical field of application of piezoelectric materials is in the manufacture of ceramic filters. In such applications, it is desirable and essential that the electromechanical coupling factor have an optimum value, and that the factor vary over a wide range from an extremely high to a very low value. This is fully described in, for example, the paper of Macario referred to above. The mechanical quality factor is reciprocally related to the energy consumed by the material during the energy conversion, and, the larger the mechanical quality factor, the smaller is the energy consumed.

The transducer elements of mechanical filters provide still other important fields of application of piezoelectric ceramics. In this case both the electromechanical coupling factor and the mechanical quality factor should be as large as possible.

It is well known that conventional piezoelectric ceramics, for example, barium titanate ($BaTiO_3$) and lead titanate-zirconate [$Pb(Ti \cdot Zr)O_3$] exhibit a small electromechanical coupling factor and are not generally satisfactory for practical use. Improvement of this factor has been made by incorporating various additional constituents into the ceramic composition.

The object of this invention is to provide novel piezoelectric ceramics having a large electromechanical coupling factor.

Another object of the invention is to provide novel piezoelectric ceramics suited for use in particular fields, such as in the manufacture of transducers for transmitting and receiving ultrasonic waves where a very large electromechanical coupling factor is required.

A further object of this invention is to provide piezoelectric ceramics having large values of both the electromechanical coupling factor and mechanical quality factor.

A still another object of this invention is to provide piezoelectric ceramics suited for use in such fields as the manufacture of elements of ceramic filters and transducers, the elements of mechanical filters, where a large or widely ranged electromechanical coupling factor, and a large mechanical quality factor are required.

This invention is based on the new discovery that the ceramic compositions consisting essentially of a solid solution of $$Pb(Fe_{1/3}Z_{2/3})O_3 \text{—} PbTiO_3 \text{—} PbZrO_3$$

ternary system, where Z represents one element selected from Nb and Sb, show the excellent piezoelectric activity and hence have the practical utility. Lead (Pb) contained in the above ceramic composition may be replaced by up to about 25% atom percent of at least one element from the group consisting of barium (Ba), strontium (Sr) and calcium (Ca).

The above ceramic compositions contain lead (Pb) as a divalent metallic element and titanium (Ti) and zirconium (Zr) as tetravalent metallic elements. Moreover, the element iron (Fe) and one element selected from the group consisting of niobium (Nb) and antimony (Sb) are contained in such proportion that they may be, as a whole, substantially equivalent to a tetravelent metallic element.

In the case where niobium (Nb) is selected for Z, and where the ceramic material of the ternary system $$Pb(Fe_{1/3}Nb_{2/3})O_3\text{—}PbTiO_3\text{—}PbZrO_3$$

is represented by the compositional formula $$[Pb(Fe_{1/3}Nb_{2/3})O_3]_x[PbTiO_3]_y[PbZrO_3]_z$$

where $x$, $y$ or $z$ is the mol ratio of each component and $x+y+z=1.00$, it has been found that in order to obtain the most preferred properties, the compositions should fall within the range determined by the following combination of mol ratios $x$, $y$ and $z$:

| $x$ | $y$ | $z$ |
|---|---|---|
| 0.01 | 0.55 | 0.44 |
| 0.01 | 0.09 | 0.90 |
| 0.10 | 0.00 | 0.90 |
| 0.40 | 0.00 | 0.60 |
| 0.50 | 0.10 | 0.40 |
| 0.50 | 0.30 | 0.20 |
| 0.20 | 0.65 | 0.15 |
| 0.10 | 0.75 | 0.15 |
| 0.05 | 0.75 | 0.20 |

Also, when antimony (Sb) is selected for Z, the effective range of the ceramic compositions given by the formula $$[Pb(Fe_{1/3}Sb_{2/3})O_3]_x[PbTiO_3]_y[PbZrO_3]_z$$

where $x+y+z=1.00$, the composition being determined by the following combination of mol ratios $x$, $y$ and $z$:

| $x$ | $y$ | $z$ |
|---|---|---|
| 0.01 | 0.55 | 0.44 |
| 0.01 | 0.09 | 0.90 |
| 0.10 | 0.00 | 0.90 |
| 0.40 | 0.00 | 0.60 |
| 0.40 | 0.40 | 0.20 |
| 0.05 | 0.75 | 0.20 |

It has also been found that the incorporation of manganese oxide in an amount of about 0.10 to 3.0 weight percent in the form of MnO to any composition mentioned above improves the mechanical quality factor of the composition without substantially adversely decreasing the electromechanical coupling factor and also produces useful piezoelectric ceramics applicable to elements of ceramic filters, to the transducer elements of mechanical filters, and the like.

Among the conventional piezoelectric ceramics known is a ceramic solid solution of the ternary system $$Pb(Mg_{1/3}Nb_{2/3})O_3—PbTiO_3—PbZrO_3$$

which is disclosed in the U.S. Pat. 3,268,453, granted Aug. 23, 1966 to H. Ouchi et al. This conventional ceramic material by itself, however, does not provide improved piezoelectric properties of previous PbTiO₃—PbZrO₃ ceramics. Improved piezoelectric ceramic material is obtained only by adding thereto at least one of oxides of manganese, cobalt, nickel, iron and chromium as additional constituents in amounts up to about 3 weight percent. In contrast, the $$Pb(Fe_{1/3}Z_{2/3})O_3—PbTiO_3—PbZrO_3$$

compositions of this invention, where Z represents Nb or Sb, result in markedly improved piezoelectric properties by itself (without requiring the addition of another constituent). This difference in improvement of piezoelectric properties between the conventional compositions and the novel compositions of this invention is, it is believed, due to the fact that the conventional compositions use magnesium (Mg), an element belonging to the Group II–A in the Periodic Table, in conjunction with a Group V–B element niobium (Nb), whereas in the compositions of this invention, a Group VIII element iron (Fe) is used in conjunction with a Group V–B or V–A element (Nb) or antimony (Sb).

Excellent piezoelectric activities of the ceramic compositions of this invention will be apparent from the following more particular description of preferred examples of this invention, as illustrated in the accompanying drawings, wherein.

Figure 3:
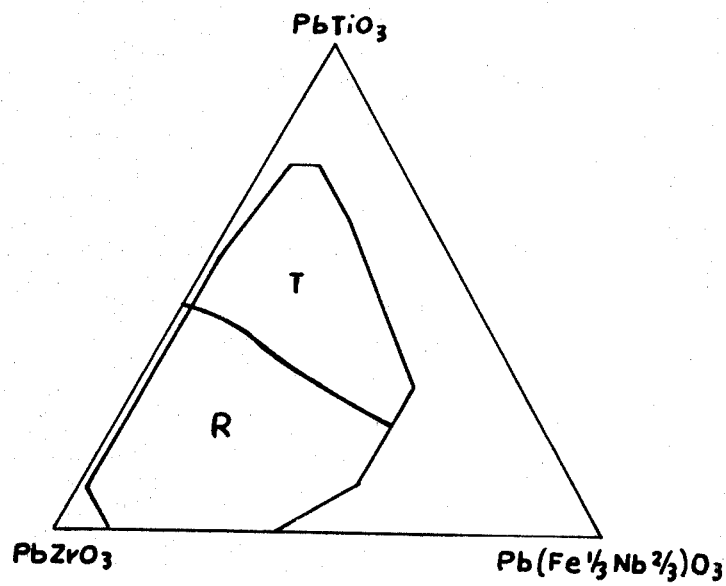
Figure 6:
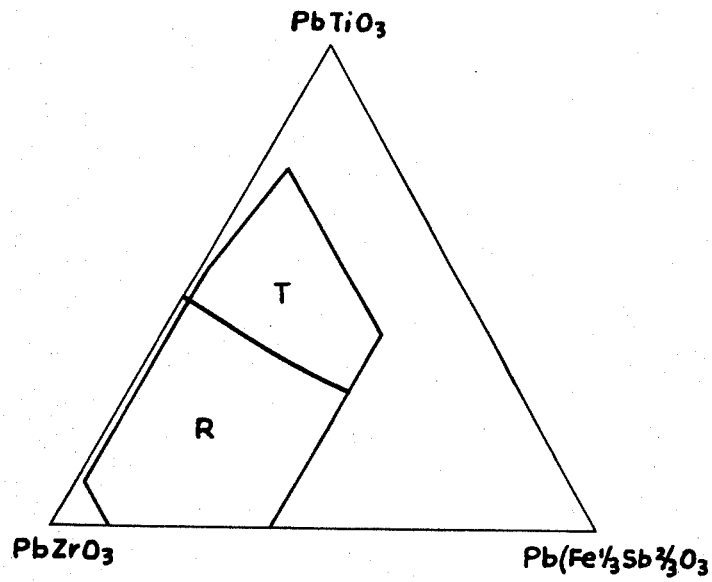
Figure 7:
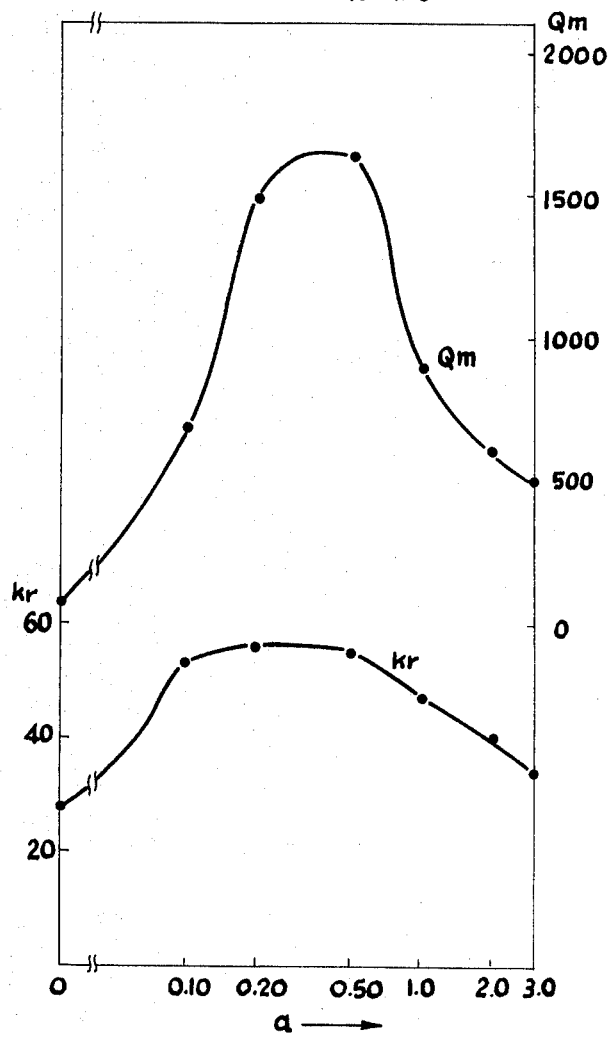
Figure 8:
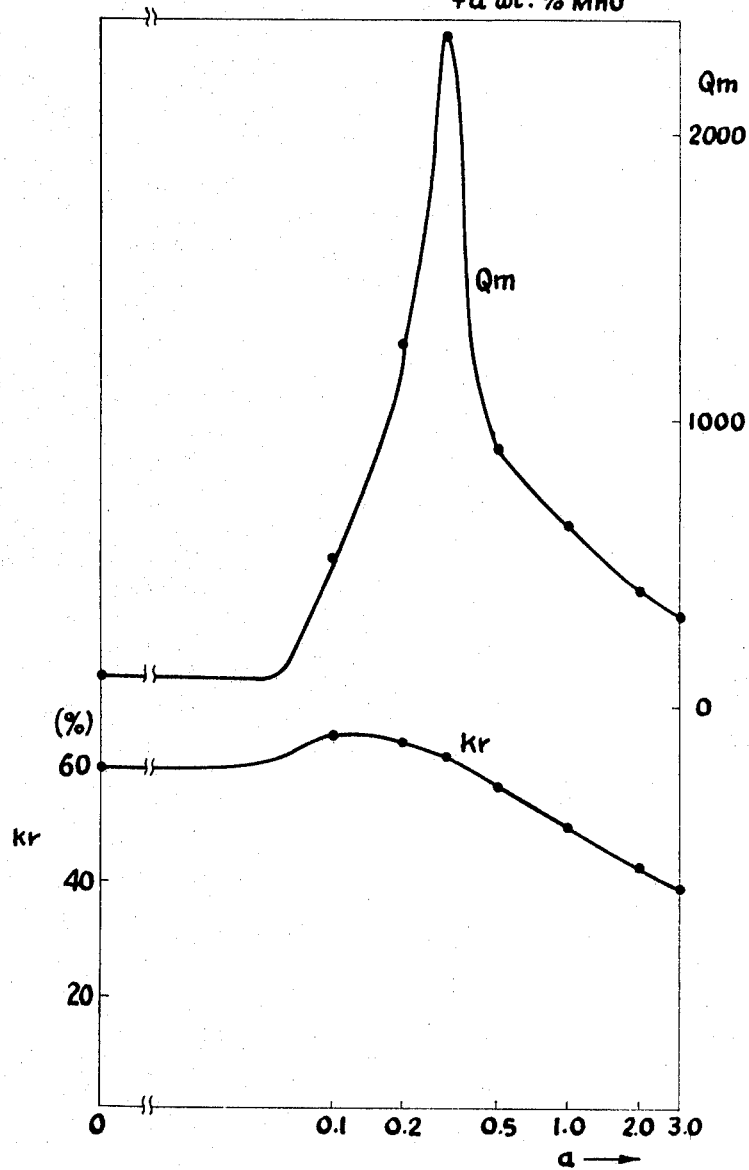

FIGS. 3 and 6 are the phase diagrams of the ternary system of this invention; and FIGS. 7 and 8 are graphs showing the electromechanical coupling factor and the mechanical quality factor of modified ceramics of this invention, as a function of the amount of addition of manganese oxide; while FIGS. 1, 2, 3 and 7 show the novel ternary system $$Pb(Fe_{1/3}Nb_{2/3})O_3—PbTiO_3—PbZrO_3$$

among the ceramic compositions of this invention; and FIGS. 4, 5, 6 and 8 are illustrative of the novel ternary system $$Pb(Fe_{1/3}Sb_{2/3})O_3—PbTiO_3—PbZrO_3$$

among the ceramic compositions of this invention.

EXAMPLES

Powdered materials of lead monoxide (PbO), ferric oxide (Fe₂O₃), niobium pentoxide (Nb₂O₅), titanium dioxide (TiO₂), and zirconium dioxide (ZrO₂) were used as starting materials to obtain the $$Pb(Fe_{1/3}Nb_{2/3})O_3—PbTiO_3—PbZrO_3$$

ceramics of this invention, unless otherwise stated. These powdered materials were proportioned to provide final specimens having the compositions shown in Table 1. The same materials, together with manganese carbonate (MnCO₃), were used to produce the aforementioned ceramics containing manganese monoxide (MnO), unless otherwise mentioned. The materials were proportioned to provide final specimens of the basic composition having various mol ratios $x$, $y$ and $z$ and manganese monoxide (MnO) in an amount from 0.1 to 3.0 weight percent as shown in Table 3. Additional specimens were produced containing barium carbonate (BaCO₃), strontium carbonate (SrCO₃) or calcium carbonate (CaCO₃) using the same starting materials to obtain the ceramics having the compositions shown in Table 5, in which $u$ atom percent of lead (Pb) of the basic composition having the mol ratios $x$, $y$ and $z$ of the system $Pb(Fe_{1/3}Nb_{2/3})O_3$, PbTiO₃ and PbZrO₃ was replaced by barium (Ba), strontium (Sr) or calcium (Ca) as represented by Me in the table. In producing the embodiment containing antimony, powdered materials of lead monoxide (PbO), ferric oxide (Fe₂O₃), antimony sesquioxide (Sb₂O₃), titanium dioxide (TiO₂), and zirconium dioxide (ZrO₂) were used as starting materials to obtain the $$Pb(Fe_{1/3}Sb_{2/3})O_3—PbTiO_3—PbZrO_3$$

ceramics of this invention, unless otherwise stated. These powders were weighed to provide final specimens having the compositions shown in Table 2.

Also, the above materials with manganese carbonate (MnCO₃) were used to produce the same ceramics containing manganese monoxide (MnO), unless otherwise indicated. These were proportioned to produce final specimens of the basic composition containing manganese oxide as shown in Table 4. Besides, barium carbonate (BaCO₃), strontium carbonate (SrCO₃) or calcium carbonate (CaCO₃) was added to each group of the above starting materials to obtain the ceramics having the compositions shown in Table 6, except that $u$ atom percent of lead (Pb) contained in the basic composition having the mol ratios $x$, $y$ and $z$ of the system $Pb(Fe_{1/3}Sb_{2/3})O_3$, PbTiO₃ and PbZrO₃ was replaced by Me (Ba, Sr or Ca). Here, ferric oxide (Fe₂O₃), antimony sesquioxide (Sb₂O₃), manganese carbonate (MnCO₃), and barium, strontium or calcium carbonate (BaCO₃, SrCO₃ or CaCO₃) were weighed as calculated on the basis of ferrous oxide (FeO), antimony pentoxide (Sb₂O₅), manganese monoxide (MnO) and barium, strontium or calcium oxide (BaO, SrO or CaO), respectively. In addition, lead monoxide, titanium dioxide and zirconium dioxide were weighed to produce the conventional lead titanate-zirconate ceramics having the compositions shown in Table 7.

The respective powders were mixed in a ball mill with distilled water. The mixed powders were subjected to filtration, dried, crushed, then pre-sintered at 900° C. for one hour, and again crushed. Thereafter, the mixtures, with a small amount of distilled water added thereto, were press-molded into discs of 20 mm. in diameter at a pressure of 700 kg./cm.² and sintered in an atmosphere of lead monoxide (PbO) for one hour at a temperature between 1260° C. and 1300° C. As for the specimens containing less than 40 mol percent of $Pb(Fe_{1/3}Nb_{2/3})O_3$ and for those containing 40 mol percent or more of the same, the specific temperatures of 1300° C. and 1270° C. were used, respectively, on sintering. The resulting ceramic discs were polished on both surfaces to the thickness of one millimeter, provided with silver electrodes on both surfaces, and thereafter piezoelectrically activated through the polarization treatment at 100° C. for one hour under an applied D.C. electric field of 50 kv./cm.

As for some specimens, however, the polarization treatment was carried out under different conditions. In detail, the D.C. electric fields of 40 kv./cm. and 30 kv./cm. were used instead of 50 kv./cm., respectively, for the specimens containing more than 30 mol percent but not more than 40 mol percent of $Pb(Fe_{1/3}Nb_{2/3})O_3$ and for those containing more than 40 mol percent of the same component. Also, for the specimens containing more than 20 mol percent but not more than 30 mol percent of $$Pb(Fe_{1/3}Sb_{2/3})O_3$$

room temperature instead of 100° C. was used, while a test at room temperature and 40 kv./cm. D.C. electric field was used for those compositions containing more than 30 mol percent of the same.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $k_r$ was calculated by the resonant to antiresonant frequency method. The dielectric constant ($\epsilon$) and the dielectric loss (tan $\delta$) were also measured at a frequency of 1 kHz.

Tables 1 through 7 show typical results obtained. In Tables 1 and 2, the specimens are arranged according to the $PbTiO_3$ content and there are also listed several values of Curie temperature which was determined through measurement of temperature variation in the dielectric constant ($\epsilon$). The novel compositions of the specimens of Tables 1 and 2 are shown with black points in FIGS. 1 and 4, respectively, while the conventional compositions of the specimens of Table 7 are indicated by crosses in the same figures. In Tables 3 and 4, the specimens are arranged according to the $Pb(Fe_{1/3}Z_{2/3})O_3$ content (Z is Nb or Sb) of the basic composition, while those containing the same basic composition are arranged according to increase in the amount of manganese oxide (MnO).

Comparison of the results for the specimens Nos. 14 and 17 of Table 1, or 10 and 11 of Table 2, with those for the specimen No. 4 of Table 7 will reveal that the optimum $k_r$ values of the novel ceramics of this invention are far superior to the maximum $k_r$ value of the conventional lead titanate-zirconate ceramics which has been known as the most excellent piezoelectric ceramic material. Moreover, comparison of the results in Tables 1 or 2 with those in Table 7, particularly between the novel and conventional ceramics in which the ratios of the contents of $PbTiO_3$ and $PbZrO_3$ are similar to each other, will also show that the ceramics of this invention have a remarkably improved $k_r$ value. This latter fact will be more clearly understood from FIG. 2 or 5, wherein the thick line curve represents the $k_r$ values of a novel ceramics containing 5 mol percent of $Pb(Fe_{1/3}Nb_{2/3})O_3$ (FIG. 2) or $Pb(Fe_{1/3}Sb_{2/3})O_3$ (FIG. 5), the varying content $y$ of $PbTiO_3$ and the remaining content of $PbZrO_3$, while the fine line curve shows the $k_r$ values of a conventional lead titanate-zirconate ceramics with the varying content $y$ of $PbTiO_3$.

As is seen from the above, this invention provides excellent, useful piezoelectric ceramics having superior piezoelectric activities.

In the novel ceramics of the ternary system $$Pb(Fe_{1/3}Z_{2/3})O_3\text{---}PbTiO_3\text{---}PbZrO_3$$

Figure 1:
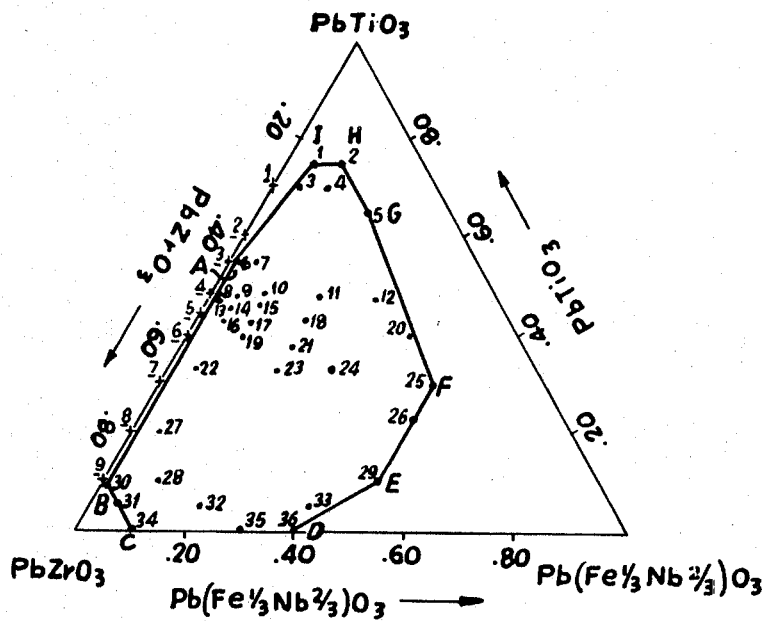
FIGS. 1 and 4 are the triangular compositional diagrams of the ternary system showing both the effective ranges of the compositions of this invention and the specific compositions of the examples.
Figure 2:
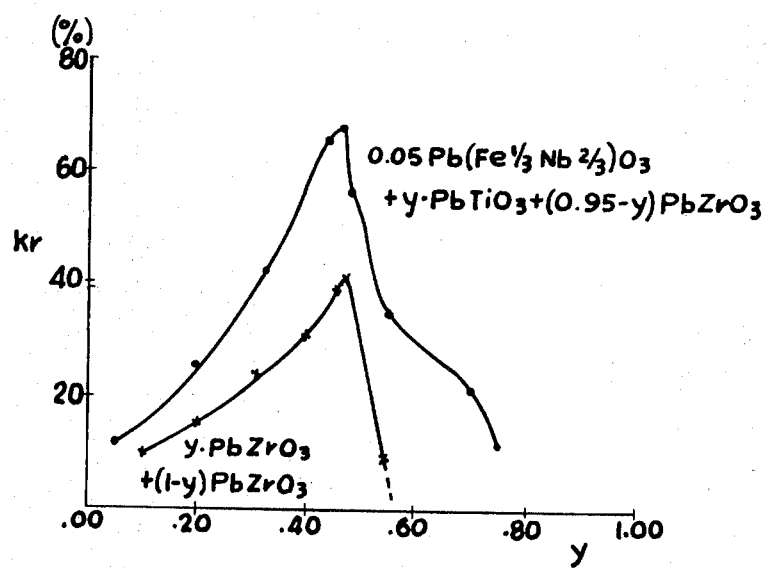
FIGS. 2 and 5 are graphs showing the electromechanical coupling factors of both the conventional lead titanate-zirconate ceramics and the ceramics of this invention, as a function of compositional change of lead titanate and lead zirconate in both ceramics.
Figure 4:
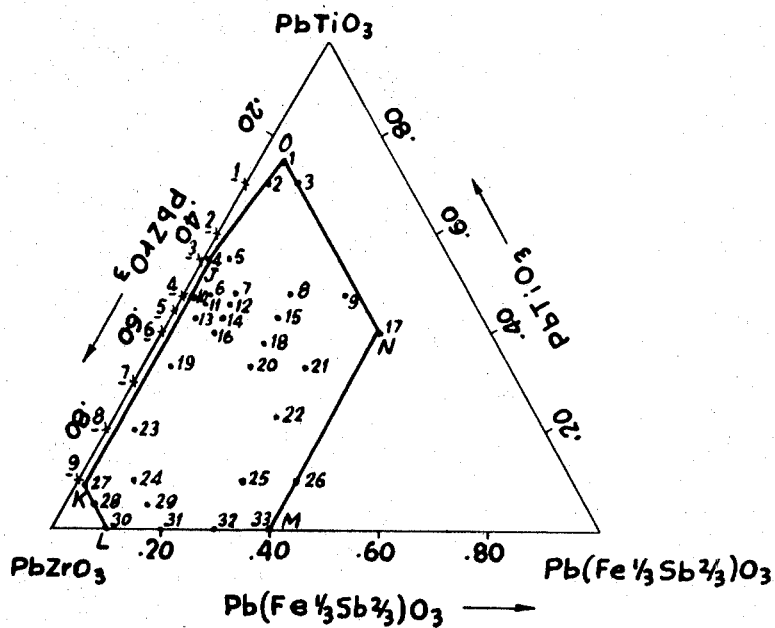
Figure 5:
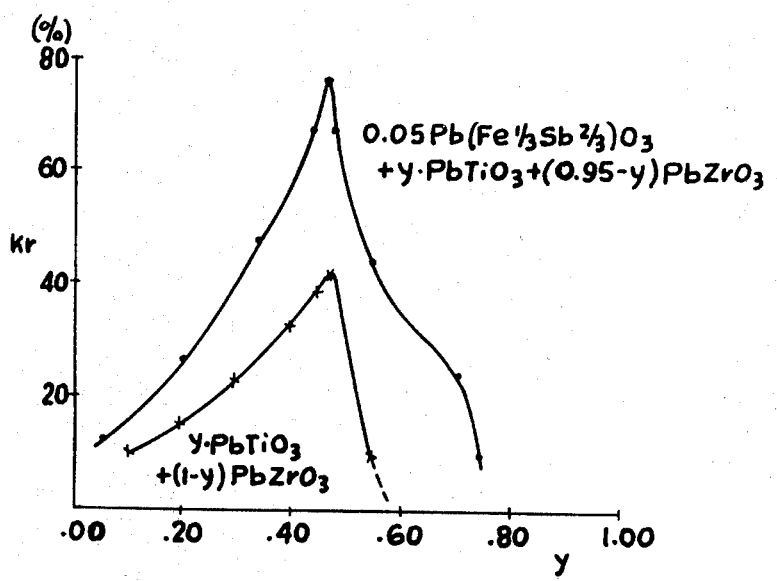

(Z is Nb or Sb) of this invention, superior piezoelectric activities as mentioned above are available in accordance with the composition represented by the formula $$[Pb(Fe_{1/3}Z_{2/3})O_3]x[PbTiO_3]y[PbZrO_3]z$$

where $x$, $y$ and $z$ represent a set of mol ratios and $x+y+z=1.00$, where Z represents one element selected from the group consisting of Nb and Sb, where the composition falls within the area A–B–C–D–E–F–G–H–I of FIG. 1 of the drawing where Z is Nb, and where the composition falls within the area J–K–L–M–N–O of FIG. 4 of the drawing where Z is Sb. The sets of mol ratios of the vertices of each area are as follows:

|   | $x$ | $y$ | $z$ |
| --- | --- | --- | --- |
| A | 0.01 | 0.55 | 0.44 |
| B | 0.01 | 0.09 | 0.90 |
| C | 0.10 | 0.00 | 0.90 |
| D | 0.40 | 0.00 | 0.60 |
| E | 0.50 | 0.10 | 0.40 |
| F | 0.50 | 0.30 | 0.20 |
| G | 0.20 | 0.65 | 0.15 |
| H | 0.10 | 0.75 | 0.15 |
| I | 0.05 | 0.75 | 0.20 |
| J | 0.01 | 0.55 | 0.44 |
| K | 0.01 | 0.09 | 0.90 |
| L | 0.10 | 0.00 | 0.90 |
| M | 0.40 | 0.00 | 0.60 |
| N | 0.40 | 0.40 | 0.20 |
| O | 0.05 | 0.75 | 0.20 |

In situations where the content of either $$Pb(Fe_{1/3}Nb_{2/3})O_3$$

or $Pb(Fe_{1/3}Sb_{2/3})O_3$ is less than that falling within the above-mentioned area, it is sometimes difficult or impossible to complete the sintering in the manufacture of the ceramics. In addition, the piezoelectric activities of the ceramics obtained are inferior to or nearly equal to those of the conventional lead titanate-zirconate ceramics or, even if slightly improved, not desirable for practical use. If the content of $Pb(Fe_{1/3}Z_{2/3})O_3$ (where Z is Nb or Sb) is greater than that falling within the above-mentioned area, it is difficult to carry out the sintering operation and, moreover, a uniform solid solution of the three components is not obtainable, with the result that the piezoelectric activities of the ceramics deteriorate to such an extent as to render the use impractical. Where the content of $PbTiO_3$ fails outside the above-mentioned area, it is difficult to obtain a densely sintered ceramic product, furthermore, the product does not exhibit piezoelectric activities of practical use. Finally, where the $PbZrO_3$ content does not fall within the above-mentioned area, the piezoelectric ceramic product is generally not too useful and has markedly inferior piezoelectric activities.

In view of the above, it is preferred that the ceramic composition of this invention, in order to insure a measure of practical use, should fall within any of the areas specified above. The ceramics of this effective composition exhibit excellent piezoelectric activities and have a high Curie temperature, as shown in Tables 1 and 2. Thus, the piezoelectric activities are maintained even at elevated temperatures.

The ternary system of $Pb(Fe_{1/3}Nb_{2/3})O_3$ or $$Pb(Fe_{1/3}Sb_{2/3})O_3\text{---}PbTiO_3\text{---}PbZrO_3$$

of this invention exists in a solid solution in greater parts of compositions and such a solid solution has a perovskite-type crystalline structure. FIGS. 3 and 6 show the crystalline phases of the ceramic compositions falling within the area A–B–C–D–E–F–G–H–I of FIG. 1 and J–K–L–M–N–O of FIG. 4, respectively as determined at room temperature by the powder method of X-ray analysis. These compositions have a perovskite-type crystalline structure and belong to either the tetragonal phase (indicated by T in the figures) of the rhombohedral phase (indicated by R). The morphotropic phase boundary is shown as a thick line in each figure. In general, the value of $k_r$ is the greatest in the vicinity of this phase boundary.

Tables 3 and 4 illustrate that the incorporation of about 0.10 to 3.0 weight percent MnO to the basic compositions $$Pb(Fe_{1/3}Nb_{2/3})O_3—PbTiO_3—PbZrO_3$$

and $$Pb(Fe_{1/3}Sb_{2/3})O_3—PbTiO_3—PbZrO_3$$

results in an increased or widely ranged value of $k_r$ and a sharply enhanced value of $Q_m$. In other words, such incorporation results in an excellent material for use in the elements of ceramic filters, transducers of mechanical filters or other fields where a high or widely ranging $k_r$ and a large $Q_m$ are both required. FIGS. 7 and 8 show the relation between the content $a$ of MnO and the resultant piezoelectric propertics ($k_r$ and $Q_m$) in specimens Nos. 13 to 19 of Table 3 and Nos. 34 to 41 of Table 4, respectively, as respectively examples. It will be clearly seen from FIGS. 7 and 8 that excellent piezoelectric properties are obtainable if the content of MnO lies within a range from 0.10 to 3.0 weight percent.

Where the MnO content is less than 0.10 weight percent, little improvement of piezoelectric properties is effected by the presence of such small amounts of MnO. If the MnO content exceeds 3.0 weight percent, $Q_m$ decreases considerably and it is difficult to obtain a uniform solid solution of the additive agent and the basic composition and to accomplish the polarization treatment. Thus, the effective and preferred range of the MNO content should be from about 0.10 to 3.0 weight percent. If the basic compositions do not fall within the above-mentioned areas A–B–C–D–E–F–G–H–I and J–K–L–M–N–O, the resultant ceramics possess rather inferior or useless piezoelectric properties.

Tables 5 and 6 reveal that excellent piezoelectric properties are still exhibited by the ceramics in which a part of Pb of the basic composition is replaced by Ba, Sr or Ca. In general, at least one of the elements of the group Ba, Sr and Ca may replace up to about 25 atom percent of Pb contained in the basic composition.

It should be noted here that the improvement made in the piezoelectric properties by incorporation of MnO is clearly due to the presence of manganese ions. There are various known methods for introducing manganese ions into the composition. For example, the presence of manganese ions may be achieved by using as a starting material manganese oxide itself, such as MnO or $MnO_2$, or other manganese compound such as $MnCO_3$ which is easily decomposed at an elevated temperature to form manganese oxide. If a manganese compound other than MnO is utilized, it should be used in an amount calculated on the basis of MnO. In the above examples, $MnCO_4$ is generally used instead of MnO. Where $MnO_2$ is used, it is exemplified by triple asterisks in Tables 3 and 4.

It will be apparent that the starting materials to be used in the manufacture of the ceramics of this invention are not limited to those used in the above examples. By way of illustration, those oxides may be used in place of any starting materials of the above examples which are easily decomposed at elevated temperature to form required compositions, as exemplified by the use of $Pb_3O_4$ for PbO in the examples. Also, such salts as the oxalates (as exemplified by $FeC_2O_4$ for FeO in the examples) or carbonates may be used instead of the oxides used in the examples, these salts being easily decomposed into their respective oxides at elevated temperatures. Similarly, hydroxides of the same character as above, such as $Nb(OH)_5$, may be used in place of the oxides, such as $Nb_2O_5$. As will be appreciated, excellent piezoelectric ceramics having similar properties to the above examples are obtainable by preparing separately powdered material of each of $Pb(Fe_{1/3}Nb_{2/3})O_3$ or $Pb(Fe_{1/3}Sb_{2/3})O_3$, $PbTiO_3$ and $PbZrO_3$ in advance and by using them as starting materials for subsequent mixing.

It is usual that niobium pentoxide ($Nb_2O_5$) and zirconium dioxide ($ZrO_2$) which are available in the market contain, respectively, several percent of tantalum pentoxide ($Ta_2O_5$) and hafnium dioxide ($HfO_2$). Accordingly, the ceramic compositions of this invention may contain small amounts of these oxides or elements existing in the materials available in the market. Moreover, it will be understood that the incorporation of a small amount of another agent in addition to or other than manganese oxide to the ceramic compositions of this invention may further improve the piezoelectric properties, such as is recognized in the conventional lead titanate-zirconate ceramics. It will be further understood from the foregoing that the ceramic compositions of this invention may include certain appropriate additives.

While there have been described what at present are believed to be the preferred examples of this invention, it will be obvious that various modifications can be made therein without departing from the scope of this invention and that this invention covers all the ceramic compositions as specified in the appended claims.

TABLE 1

| No. | Mol ratio of composition | | | $k_r$ Percent | $Q_m$ | $\epsilon$ | tan $\delta$, Percent | Curie temperature, °C. |
|---|---|---|---|---|---|---|---|---|
| | $Pb(Fe_{1/3}Nb_{2/3})O_3$ $x$ | $PbTiO_3$ $y$ | $PbZrO_3$ $z$ | | | | | |
| 1 | 0.05 | 0.75 | 0.20 | 11 | 210 | 280 | 2.2 | |
| 2 | 0.10 | 0.75 | 0.15 | 8 | 160 | 270 | 4.3 | |
| 3 | 0.05 | 0.70 | 0.25 | 22 | 340 | 320 | 2.1 | |
| 4 | 0.10 | 0.70 | 0.20 | 20 | 200 | 330 | 3.9 | |
| 5 | 0.20 | 0.65 | 0.15 | 17 | 290 | 380 | 5.3 | |
| 6 | 0.01 | 0.55 | 0.44 | 18 | 130 | 470 | 1.9 | |
| 7** | 0.05 | 0.55 | 0.40 | 35 | 170 | 590 | 2.0 | |
| 8 | 0.01 | 0.48 | 0.51 | 52 | 105 | 1,310 | 2.4 | |
| 9 | 0.05 | 0.48 | 0.47 | 53 | 100 | 1,150 | 2.1 | |
| 10* | 0.10 | 0.48 | 0.42 | 39 | 120 | 880 | 2.1 | |
| 11 | 0.20 | 0.48 | 0.32 | 36 | 180 | 740 | 2.1 | |
| 12* | 0.30 | 0.48 | 0.22 | 21 | 140 | 540 | 6.7 | |
| 13 | 0.02 | 0.47 | 0.51 | 65 | 90 | 1,510 | 2.7 | |
| 14 | 0.05 | 0.46 | 0.49 | 68 | 90 | 1,695 | 2.5 | 370 |
| 15 | 0.10 | 0.46 | 0.44 | 47 | 100 | 960 | 2.7 | |
| 16* | 0.05 | 0.43 | 0.52 | 65 | 90 | 720 | 2.8 | |
| 17 | 0.10 | 0.43 | 0.47 | 66 | 85 | 1,600 | 2.5 | 340 |
| 18 | 0.20 | 0.43 | 0.37 | 44 | 130 | 1,220 | 3.0 | |
| 19 | 0.10 | 0.40 | 0.50 | 53 | 85 | 600 | 2.5 | |
| 20 | 0.40 | 0.40 | 0.20 | 14 | 90 | 720 | 8.5 | |
| 21 | 0.20 | 0.38 | 0.42 | 58 | 95 | 1,780 | 2.7 | 285 |
| 22 | 0.05 | 0.33 | 0.62 | 42 | 160 | 490 | 3.4 | |
| 23** | 0.20 | 0.33 | 0.47 | 54 | 105 | 820 | 3.7 | |
| 24 | 0.30 | 0.33 | 0.37 | 28 | 95 | 1,520 | 5.6 | 245 |
| 25 | 0.50 | 0.30 | 0.20 | 10 | 170 | 760 | 11.7 | |
| 26 | 0.50 | 0.23 | 0.27 | 17 | 160 | 1,270 | 8.4 | |
| 27 | 0.05 | 0.20 | 0.75 | 25 | 300 | 340 | 4.2 | |
| 28 | 0.10 | 0.10 | 0.80 | 18 | 410 | 400 | 3.8 | |
| 29 | 0.50 | 0.10 | 0.40 | 7 | 220 | 670 | 12.4 | |
| 30 | 0.01 | 0.09 | 0.90 | 17 | 340 | 260 | 5.4 | |
| 31 | 0.05 | 0.05 | 0.90 | 11 | 390 | 270 | 4.3 | |
| 32 | 0.20 | 0.05 | 0.75 | 21 | 370 | 530 | 3.8 | |
| 33 | 0.40 | 0.05 | 0.55 | 11 | 350 | 575 | 4.3 | |
| 34 | 0.10 | 0.00 | 0.90 | 12 | 500 | 400 | 4.0 | - |
| 35 | 0.30 | 0.00 | 0.70 | 12 | 450 | 540 | 3.8 | |
| 36 | 0.40 | 0.00 | 0.60 | 8 | 260 | 550 | 4.1 | |

TABLE 2

| No. | Mol ratio of composition Pb(Fe$_{1/3}$Sb$_{2/3}$)O$_3$ $x$ | PbTiO$_3$ $y$ | PbZrO$_3$ $z$ | $k_r$ Percent | $Q_m$ | $\epsilon$ | tan $\delta$, Percent | Curie temperature, °C. |
|---|---|---|---|---|---|---|---|---|
| 1 | 0.05 | 0.75 | 0.20 | 8 | 180 | 260 | 1.8 | |
| 2 | 0.05 | 0.70 | 0.25 | 25 | 330 | 320 | 1.2 | |
| 3 | 0.10 | 0.70 | 0.20 | 12 | 130 | 325 | 1.4 | |
| 4 | 0.01 | 0.55 | 0.44 | 22 | 140 | 440 | 1.7 | |
| 5** | 0.05 | 0.55 | 0.40 | 43 | 160 | 710 | 1.9 | |
| 6 | 0.05 | 0.48 | 0.47 | 65 | 100 | 1,550 | 2.3 | |
| 7* | 0.10 | 0.48 | 0.42 | 50 | 130 | 1,330 | 2.2 | |
| 8 | 0.20 | 0.48 | 0.32 | 16 | 190 | 580 | 2.3 | |
| 9* | 0.30 | 0.48 | 0.22 | 10 | 270 | 380 | 5.2 | |
| 10 | 0.02 | 0.47 | 0.51 | 77 | 95 | 1,360 | 2.7 | |
| 11 | 0.05 | 0.46 | 0.49 | 77 | 83 | 1,480 | 2.8 | 325 |
| 12 | 0.10 | 0.46 | 0.44 | 55 | 105 | 1,520 | 2.6 | |
| 13 | 0.05 | 0.43 | 0.52 | 65 | 90 | 790 | 3.8 | |
| 14** | 0.10 | 0.43 | 0.47 | 60 | 105 | 1,250 | 3.3 | 285 |
| 15 | 0.20 | 0.43 | 0.37 | 27 | 140 | 860 | 3.4 | |
| 16 | 0.10 | 0.40 | 0.50 | 53 | 105 | 650 | 4.0 | |
| 17 | 0.40 | 0.40 | 0.20 | 17 | 90 | 570 | 6.8 | |
| 18 | 0.20 | 0.38 | 0.42 | 45 | 90 | 1,360 | 4.0 | 245 |
| 19* | 0.05 | 0.33 | 0.62 | 46 | 130 | 560 | 4.1 | |
| 20 | 0.20 | 0.33 | 0.47 | 37 | 145 | 820 | 5.4 | |
| 21** | 0.30 | 0.33 | 0.37 | 26 | 150 | 1,160 | 5.5 | 180 |
| 22 | 0.30 | 0.23 | 0.47 | 15 | 190 | 1,050 | 7.6 | |
| 23 | 0.05 | 0.20 | 0.75 | 26 | 290 | 410 | 4.2 | |
| 24 | 0.10 | 0.10 | 0.80 | 17 | 370 | 525 | 3.8 | |
| 25 | 0.30 | 0.10 | 0.60 | 12 | 350 | 950 | 7.8 | |
| 26 | 0.40 | 0.10 | 0.50 | 11 | 80 | 2,820 | 8.7 | |
| 27 | 0.01 | 0.09 | 0.90 | 12 | 530 | 290 | 3.8 | |
| 28 | 0.05 | 0.05 | 0.90 | 12 | 420 | 370 | 3.0 | |
| 29 | 0.15 | 0.05 | 0.80 | 10 | 390 | 475 | 4.0 | |
| 30 | 0.10 | 0.00 | 0.90 | 8 | 380 | 220 | 5.0 | |
| 31 | 0.20 | 0.00 | 0.80 | 6 | 370 | 465 | 3.9 | |
| 32 | 0.30 | 0.00 | 0.70 | 5 | 270 | 870 | 8.6 | |
| 33 | 0.40 | 0.00 | 0.60 | 4 | 190 | 2,100 | 8.9 | |

NOTE.—In the manufacture of the specimens whose numbers have a single asterisk in Tables 1 and 2, triplumbic tetroxide (Pb$_3$O$_4$) was used instead of lead monoxide (PbO) as one of the starting materials.
Also, for the specimens with double asterisks, ferrous oxalate (FeC$_2$O$_4$) calculated on the basis of ferrous oxide (FeO) was used in place of ferric oxide (Fe$_2$O$_3$).
With regard to those specimens having a triple asterisk, manganese dioxide (MnO$_2$) was used instead of manganese carbonate as one of the starting materials.

TABLE 3

| No. | Mol ratio of composition Pb(Fe$_{1/3}$Nb$_{2/3}$)O$_3$ $x$ | PbTiO$_3$ $y$ | PbZrO$_3$ $z$ | Additive agent MnO, wt. percent | $k_r$, percent | $Q_m$ | $\epsilon$ | tan $\delta$, percent |
|---|---|---|---|---|---|---|---|---|
| 1 | 0.50 | 0.10 | 0.40 | 0.00 | 7 | 220 | 670 | 12.4 |
| 2 | 0.50 | 0.10 | 0.40 | 0.10 | 7 | 680 | 610 | 3.2 |
| 3 | 0.50 | 0.10 | 0.40 | 0.50 | 9 | 1,020 | 530 | 2.6 |
| 4 | 0.50 | 0.10 | 0.40 | 3.0 | 6 | 770 | 490 | 5.7 |
| 5 | 0.50 | 0.30 | 0.20 | 0.00 | 10 | 170 | 760 | 11.7 |
| 6 | 0.50 | 0.30 | 0.20 | 0.10 | 12 | 490 | 700 | 3.0 |
| 7 | 0.50 | 0.30 | 0.20 | 0.50 | 14 | 1,360 | 650 | 2.5 |
| 8 | 0.50 | 0.30 | 0.20 | 3.0 | 10 | 920 | 620 | 5.8 |
| 9 | 0.40 | 0.00 | 0.60 | 0.00 | 8 | 260 | 550 | 4.1 |
| 10 | 0.40 | 0.00 | 0.60 | 0.60 | 8 | 730 | 510 | 2.6 |
| 11 | 0.40 | 0.00 | 0.60 | 0.50 | 10 | 1,260 | 460 | 1.8 |
| 12 | 0.40 | 0.00 | 0.60 | 3.0 | 6 | 690 | 430 | 3.2 |
| 13 | 0.30 | 0.33 | 0.37 | 0.00 | 28 | 95 | 1,520 | 5.6 |
| 14 | 0.30 | 0.33 | 0.37 | 0.10 | 53 | 680 | 1,260 | 1.1 |
| 15*** | 0.30 | 0.33 | 0.37 | 0.20 | 56 | 1,480 | 1,170 | 1.0 |
| 16 | 0.30 | 0.33 | 0.37 | 0.50 | 55 | 1,630 | 920 | 1.2 |
| 17 | 0.30 | 0.33 | 0.37 | 1.0 | 47 | 900 | 770 | 2.4 |
| 18 | 0.30 | 0.33 | 0.37 | 2.0 | 40 | 610 | 650 | 2.8 |
| 19 | 0.30 | 0.33 | 0.37 | 3.0 | 34 | 500 | 610 | 3.4 |
| 20 | 0.20 | 0.38 | 0.42 | 0.00 | 58 | 95 | 1,780 | 2.7 |
| 21 | 0.20 | 0.38 | 0.42 | 0.10 | 64 | 430 | 1,540 | 1.3 |
| 22 | 0.20 | 0.38 | 0.42 | 0.20 | 64 | 1,240 | 1,270 | 1.1 |
| 23 | 0.20 | 0.38 | 0.42 | 0.50 | 63 | 1,590 | 790 | 1.4 |
| 24 | 0.20 | 0.38 | 0.42 | 1.0 | 58 | 770 | 780 | 2.5 |
| 25 | 0.20 | 0.38 | 0.42 | 2.0 | 48 | 510 | 680 | 2.8 |
| 26 | 0.20 | 0.38 | 0.42 | 3.0 | 42 | 420 | 640 | 3.5 |
| 27 | 0.20 | 0.65 | 0.15 | 0.00 | 17 | 290 | 380 | 5.3 |
| 28 | 0.20 | 0.65 | 0.15 | 0.10 | 15 | 620 | 360 | 2.3 |
| 29 | 0.20 | 0.65 | 0.15 | 0.50 | 05 | 1,290 | 350 | 1.6 |
| 30 | 0.20 | 0.65 | 0.15 | 3.0 | 12 | 750 | 320 | 2.9 |
| 31 | 0.10 | 0.00 | 0.90 | 0.00 | 12 | 500 | 400 | 4.0 |
| 32 | 0.10 | 0.00 | 0.90 | 0.10 | 14 | 1,100 | 360 | 2.1 |
| 33 | 0.10 | 0.00 | 0.90 | 0.50 | 13 | 1,230 | 320 | 1.4 |
| 34 | 0.10 | 0.00 | 0.90 | 3.0 | 10 | 870 | 290 | 3.5 |
| 35 | 0.10 | 0.10 | 0.80 | 0.00 | 18 | 410 | 400 | 3.8 |
| 36 | 0.10 | 0.10 | 0.80 | 0.10 | 16 | 1,270 | 330 | 1.8 |
| 37 | 0.10 | 0.10 | 0.80 | 0.20 | 14 | 2,940 | 270 | 1.0 |
| 38 | 0.10 | 0.10 | 0.80 | 0.50 | 11 | 4,490 | 260 | 1.1 |
| 39 | 0.10 | 0.10 | 0.80 | 1.0 | 9 | 1,850 | 240 | 1.5 |
| 40 | 0.10 | 0.43 | 0.47 | 0.00 | 66 | 85 | 1,600 | 2.5 |
| 41 | 0.10 | 0.42 | 0.47 | 0.10 | 42 | 240 | 1,050 | 1.3 |
| 42 | 0.10 | 0.43 | 0.47 | 0.20 | 69 | 1,430 | 1,030 | 1.1 |
| 43 | 0.10 | 0.43 | 0.47 | 0.50 | 68 | 1,140 | 1,010 | 1.5 |
| 44 | 1.10 | 0.43 | 0.47 | 1.0 | 51 | 620 | 930 | 1.8 |
| 45 | 0.10 | 0.48 | 0.42 | 0.00 | 39 | 120 | 880 | 2.1 |
| 46 | 0.10 | 0.48 | 0.42 | 0.10 | 41 | 400 | 870 | 1.1 |
| 47 | 0.10 | 0.48 | 0.42 | 0.20 | 43 | 1,600 | 840 | 0.9 |
| 48 | 0.10 | 0.48 | 0.42 | 0.50 | 39 | 3,210 | 780 | 1.1 |
| 49*** | 0.10 | 0.48 | 0.42 | 1.0 | 36 | 1,900 | 740 | 1.3 |
| 50 | 0.10 | 0.48 | 0.42 | 2.0 | 31 | 1,110 | 680 | 1.8 |
| 51 | 0.10 | 0.48 | 0.42 | 3.0 | 28 | 740 | 620 | 2.2 |
| 52 | 0.10 | 0.75 | 0.15 | 0.00 | 8 | 160 | 270 | 4.3 |
| 53 | 0.10 | 0.75 | 0.15 | 0.10 | 6 | 430 | 250 | 2.5 |
| 54*** | 0.10 | 0.75 | 0.15 | 0.50 | 8 | 1,040 | 240 | 1.4 |
| 55 | 0.10 | 0.75 | 0.15 | 3.0 | 6 | 680 | 230 | 2.7 |
| 56 | 0.05 | 0.33 | 0.62 | 0.00 | 42 | 160 | 490 | 3.4 |

TABLE 3—Continued

| No. | Mol ratio of composition Pb(Fe₁/₃Nb₂/₃)O₃ $x$ | PbTiO₃ $y$ | PbZrO₃ $z$ | Additive agent MnO, wt. percent | $k_r$, percent | $Q_m$ | $\epsilon$ | tan δ, percent |
|---|---|---|---|---|---|---|---|---|
| 57 | 0.05 | 0.33 | 0.62 | 0.10 | 31 | 640 | 430 | 1.3 |
| 58 | 0.05 | 03.3 | 0.62 | 0.20 | 33 | 4,440 | 430 | 1.1 |
| 59 | 0.05 | 0.33 | 0.62 | 0.50 | 27 | 1,260 | 320 | 1.3 |
| 60 | 0.05 | 0.33 | 0.62 | 1.0 | 23 | 810 | 300 | 1.8 |
| 61 | 0.05 | 0.46 | 0.49 | 0.00 | 68 | 90 | 1,695 | 2.5 |
| 62 | 0.05 | 0.46 | 0.49 | 0.10 | 38 | 520 | 1,160 | 1.2 |
| 63 | 0.05 | 0.46 | 0.49 | 0.20 | 51 | 1,610 | 1,110 | 1.1 |
| 66*** | 0.05 | 0.46 | 0.49 | 0.30 | 56 | 940 | 1,050 | 1.4 |
| 65 | 0.05 | 04.6 | 0.49 | 0.50 | 52 | 780 | 930 | 1.8 |
| 66 | 0.05 | 0.55 | 0.40 | 0.00 | 35 | 170 | 590 | 2.0 |
| 67 | 0.05 | 0.55 | 0.40 | 0.10 | 14 | 1,450 | 510 | 1.1 |
| 68 | 0.05 | 0.55 | 0.40 | 0.20 | 32 | 3,160 | 500 | 1.3 |
| 69 | 0.05 | 0.55 | 0.40 | 0.50 | 33 | 1,630 | 480 | 1.5 |
| 70 | 0.05 | 0.55 | 0.40 | 1.0 | 26 | 1,080 | 460 | 1.8 |
| 71 | 0.05 | 0.55 | 0.40 | 2.0 | 23 | 780 | 460 | 2.0 |
| 72 | 0.05 | 0.55 | 0.40 | 3.0 | 21 | 680 | 430 | 2.4 |
| 73 | 0.05 | 0.75 | 0.20 | 0.00 | 11 | 210 | 280 | 2.2 |
| 74 | 0.05 | 0.75 | 0.20 | 0.10 | 10 | 630 | 270 | 1.1 |
| 75 | 0.05 | 0.75 | 0.20 | 0.50 | 12 | 1,190 | 250 | 1.0 |
| 76 | 0.05 | 0.75 | 0.20 | 3.0 | 10 | 710 | 240 | 1.8 |
| 77 | 0.02 | 0.47 | 0.51 | 0.00 | 65 | 90 | 1,510 | 2.7 |
| 78 | 0.02 | 0.47 | 0.51 | 0.10 | 47 | 240 | 1,240 | 1.6 |
| 79 | 0.02 | 0.47 | 0.51 | 0.20 | 67 | 1,250 | 1,160 | 0.9 |
| 80*** | 0.02 | 0.47 | 0.51 | 0.30 | 60 | 940 | 870 | 1.2 |
| 81 | 0.02 | 0.47 | 0.51 | 0.50 | 57 | 830 | 690 | 1.5 |
| 82 | 0.01 | 0.09 | 0.90 | 0.00 | 17 | 340 | 260 | 5.4 |
| 83 | 0.01 | 0.09 | 0.90 | 0.10 | 16 | 820 | 240 | 2.1 |
| 84 | 0.01 | 0.09 | 0.90 | 0.50 | 15 | 1,630 | 200 | 1.8 |
| 85 | 0.01 | 0.09 | 0.90 | 3.0 | 12 | 990 | 180 | 3.6 |
| 86 | 0.01 | 0.55 | 0.44 | 0.00 | 18 | 130 | 470 | 1.9 |
| 87 | 0.01 | 0.55 | 0.44 | 0.10 | 16 | 1,040 | 430 | 1.2 |
| 88 | 0.01 | 0.55 | 0.44 | 0.50 | 12 | 1,310 | 260 | 1.1 |
| 89 | 0.01 | 0.55 | 0.44 | 3.0 | 10 | 780 | 320 | 2.0 |

TABLE 4

| No. | Mol ratio of basic composition Pb(Fe₁/₃Sb₂/₃)O₃ $x$ | PbTiO₃ $y$ | PbZrO₃ $z$ | Additive agent MnO, wt. percent | $k_r$, percent | $Q_m$ | $\epsilon$ | tan δ, percent |
|---|---|---|---|---|---|---|---|---|
| 1 | 0.40 | 0.00 | 0.40 | 0.00 | 4 | 190 | 2,100 | 8.9 |
| 2 | 0.40 | 0.00 | 0.60 | 0.10 | 12 | 910 | 1,860 | 2.5 |
| 3 | 0.40 | 0.00 | 0.60 | 0.50 | 8 | 1,480 | 1,650 | 1.9 |
| 4 | 0.40 | 0.00 | 0.60 | 3.0 | 4 | 870 | 1,510 | 5.6 |
| 5 | 0.40 | 0.40 | 0.20 | 0.00 | 17 | 90 | 570 | 6.8 |
| 6 | 0.40 | 0.40 | 0.20 | 0.10 | 28 | 370 | 510 | 1.6 |
| 7 | 0.40 | 0.40 | 0.20 | 0.50 | 27 | 1,480 | 430 | 1.4 |
| 8 | 0.40 | 0.40 | 0.20 | 3.0 | 18 | 310 | 400 | 3.8 |
| 9 | 0.30 | 0.23 | 0.47 | 0.00 | 15 | 190 | 1,050 | 7.6 |
| 10 | 0.30 | 0.23 | 0.47 | 0.10 | 26 | 925 | 830 | 1.1 |
| 11 | 0.30 | 0.23 | 0.47 | 0.20 | 26 | 1,690 | 810 | 1.0 |
| 12 | 0.30 | 0.23 | 0.47 | 0.30 | 25 | 2,140 | 820 | 1.4 |
| 13 | 0.30 | 0.23 | 0.47 | 0.50 | 23 | 1,480 | 960 | 4.5 |
| 14 | 0.20 | 0.33 | 0.47 | 0.00 | 37 | 145 | 820 | 5.4 |
| 15 | 0.20 | 0.33 | 0.47 | 0.10 | 37 | 610 | 650 | 1.2 |
| 16 | 0.20 | 0.33 | 0.47 | 0.20 | 39 | 1,470 | 590 | 0.9 |
| 17 | 0.20 | 0.33 | 0.47 | 0.30 | 39 | 2,390 | 600 | 0.9 |
| 18 | 0.20 | 0.33 | 0.47 | 0.50 | 39 | 2,900 | 610 | 0.9 |
| 19 | 0.20 | 0.48 | 0.32 | 0.00 | 16 | 190 | 580 | 2.3 |
| 20 | 0.20 | 0.48 | 0.32 | 0.10 | 26 | 920 | 600 | 1.1 |
| 21 | 0.20 | 0.48 | 0.32 | 0.20 | 31 | 1,430 | 610 | 0.9 |
| 22 | 0.20 | 0.48 | 0.32 | 0.30 | 31 | 2,700 | 670 | 0.9 |
| 23*** | 0.20 | 0.48 | 0.32 | 0.50 | 32 | 1,760 | 770 | 1.8 |
| 24 | 0.10 | 0.00 | 0.90 | 0.00 | 8 | 380 | 220 | 5.0 |
| 25 | 0.10 | 0.00 | 0.90 | 0.10 | 10 | 530 | 200 | 1.6 |
| 26 | 0.10 | 0.00 | 0.90 | 0.50 | 13 | 1,190 | 180 | 1.3 |
| 27 | 0.10 | 0.00 | 0.90 | 3.0 | 6 | 580 | 170 | 3.8 |
| 28 | 0.10 | 0.10 | 0.80 | 0.00 | 17 | 370 | 525 | 3.8 |
| 29 | 0.10 | 0.10 | 0.80 | 0.10 | 20 | 720 | 480 | 2.0 |
| 30 | 0.10 | 0.10 | 0.80 | 0.20 | 21 | 2,990 | 440 | 1.5 |
| 31 | 0.10 | 0.10 | 0.80 | 0.30 | 23 | 4,560 | 380 | 0.9 |
| 32 | 0.10 | 0.10 | 0.80 | 0.50 | 22 | 4,410 | 330 | 1.1 |
| 33 | 0.10 | 0.10 | 0.80 | 1.0 | 20 | 3,230 | 310 | 2.3 |
| 34 | 0.10 | 0.43 | 0.47 | 0.00 | 60 | 105 | 1,250 | 3.3 |
| 35 | 0.10 | 0.43 | 0.47 | 0.10 | 65 | 520 | 1,080 | 1.2 |
| 36*** | 0.10 | 0.43 | 0.47 | 0.20 | 64 | 1,260 | 830 | 1.0 |
| 37 | 0.10 | 0.43 | 0.47 | 0.30 | 61 | 2,380 | 600 | 0.9 |
| 38 | 0.10 | 0.43 | 0.47 | 0.50 | 56 | 900 | 600 | 1.5 |
| 39 | 0.10 | 0.43 | 0.47 | 1.0 | 49 | 620 | 580 | 1.9 |
| 40 | 0.10 | 0.43 | 0.47 | 2.0 | 42 | 400 | 560 | 2.5 |
| 41 | 0.10 | 0.43 | 0.47 | 3.0 | 38 | 310 | 550 | 3.2 |
| 42 | 0.10 | 0.48 | 0.42 | 0.00 | 50 | 130 | 1,330 | 2.2 |
| 43 | 0.10 | 0.48 | 0.42 | 0.10 | 51 | 600 | 1,180 | 1.3 |
| 44 | 0.10 | 0.48 | 0.42 | 0.20 | 56 | 1,380 | 1,220 | 1.3 |
| 45 | 0.10 | 0.48 | 0.42 | 0.30 | 55 | 1,650 | 1,240 | 1.3 |
| 46 | 0.10 | 0.48 | 0.42 | 0.50 | 40 | 1,030 | 1,050 | 5.7 |
| 47 | 0.05 | 0.455 | 0.495 | 0.00 | 75 | 90 | 1,170 | 3.3 |
| 48 | 0.05 | 0.455 | 0.496 | 0.05 | 52 | 180 | 950 | 2.0 |
| 49 | 0.05 | 0.455 | 0.495 | 0.10 | 51 | 460 | 830 | 1.1 |
| 50 | 0.05 | 0.455 | 0.495 | 0.20 | 59 | 1,440 | 560 | 1.3 |
| 51*** | 0.05 | 0.455 | 0.495 | 0.30 | 62 | 1,540 | 560 | 1.5 |
| 52 | 0.05 | 0.455 | 0.495 | 0.50 | 56 | 990 | 570 | 1.9 |
| 53 | 0.05 | 0.455 | 0.495 | 1.0 | 49 | 740 | 550 | 2.4 |
| 54 | 0.05 | 0.455 | 0.495 | 2.0 | 31 | 380 | 530 | 2.8 |
| 55 | 0.05 | 0.455 | 0.495 | 2.0 | 30 | 320 | 500 | 3.0 |
| 56 | 0.05 | 0.48 | 0.47 | 0.00 | 65 | 100 | 1,550 | 2.3 |
| 57 | 0.05 | 0.48 | 0.47 | 0.10 | 38 | 860 | 700 | 1.0 |
| 58 | 0.05 | 0.48 | 0.47 | 0.20 | 56 | 1,340 | 1,300 | 1.0 |
| 59 | 0.05 | 0.48 | 0.47 | 0.30 | 59 | 1,750 | 1,210 | 1.2 |
| 60 | 0.05 | 0.55 | 0.40 | 0.00 | 43 | 160 | 710 | 1.9 |
| 61 | 0.05 | 0.55 | 0.40 | 0.10 | 21 | 740 | 610 | 1.1 |
| 62 | 0.05 | 0.55 | 0.40 | 0.20 | 31 | 800 | 490 | 1.1 |
| 63 | 0.05 | 0.75 | 0.20 | 0.00 | 8 | 180 | 260 | 1.8 |
| 64 | 0.05 | 0.75 | 0.20 | 0.10 | 13 | 390 | 240 | 0.9 |

TABLE 4—Continued

| No. | Mol ratio of basic composition | | | Additive agent MnO, wt. percent | $k_r$, percent | $Q_m$ | $\epsilon$ | tan $\delta$, percent |
|---|---|---|---|---|---|---|---|---|
| | $Pb(Fe_{1/3}Sb_{2/3})O_3$ $x$ | $PbTiO_3$ $y$ | $PbZrO_3$ $z$ | | | | | |
| 65 | 0.05 | 0.75 | 0.20 | 0.50 | 12 | 1,210 | 320 | 1.0 |
| 66 | 0.05 | 0.75 | 0.20 | 3.0 | 6 | 620 | 210 | 1.5 |
| 67 | 0.20 | 0.46 | 0.52 | 0.00 | 66 | 70 | 700 | 4.0 |
| 68 | 0.02 | 0.46 | 0.52 | 0.10 | 55 | 150 | 710 | 2.4 |
| 69 | 0.02 | 0.46 | 0.52 | 0.20 | 60 | 1,600 | 430 | 1.2 |
| 70 | 0.02 | 0.46 | 0.52 | 0.30 | 58 | 1,680 | 480 | 1.5 |
| 71 | 0.02 | 0.46 | 0.52 | 0.50 | 53 | 1,060 | 440 | 2.1 |
| 72 | 0.02 | 0.47 | 0.51 | 0.00 | 77 | 95 | 1,360 | 2.7 |
| 73 | 0.02 | 0.47 | 0.51 | 0.10 | 52 | 450 | 1,010 | 1.5 |
| 74 | 0.02 | 0.47 | 0.51 | 0.20 | 69 | 1,040 | 940 | 1.1 |
| 75 | 0.02 | 0.47 | 0.51 | 0.30 | 63 | 1,000 | 640 | 1.3 |
| 76 | 0.02 | 0.47 | 0.51 | 0.50 | 56 | 1,000 | 540 | 1.9 |
| 77 | 0.02 | 0.47 | 0.51 | 1.0 | 52 | 850 | 500 | 1.8 |
| 78 | 0.02 | 0.47 | 0.51 | 2.0 | 46 | 790 | 960 | 2.3 |
| 79 | 0.02 | 0.47 | 0.51 | 3.0 | 45 | 320 | 420 | 2.8 |
| 80 | 0.02 | 0.48 | 0.50 | 0.00 | 59 | 100 | 1,430 | 2.9 |
| 80 | 0.02 | 0.48 | 0.50 | 0.10 | 42 | 190 | 1,220 | 1.8 |
| 82 | 0.02 | 0.48 | 0.50 | 0.20 | 63 | 2,070 | 1,120 | 1.2 |
| 83 | 0.02 | 0.48 | 0.50 | 0.30 | 62 | 1,710 | 930 | 1.6 |
| 84 | 0.02 | 0.48 | 0.50 | 0.50 | 61 | 800 | 820 | 1.9 |
| 85 | 0.02 | 0.48 | 0.50 | 1.0 | 57 | 410 | 470 | 2.2 |
| 85 | 0.02 | 0.48 | 0.50 | 2.0 | 49 | 300 | 690 | 2.5 |
| 87 | 0.01 | 0.09 | 0.90 | 0.00 | 12 | 530 | 290 | 3.8 |
| 88 | 0.01 | 0.09 | 0.90 | 0.10 | 11 | 830 | 230 | 1.3 |
| 89 | 0.01 | 0.09 | 0.90 | 0.50 | 10 | 1,620 | 210 | 1.2 |
| 90 | 0.01 | 0.09 | 0.90 | 3.0 | 6 | 790 | 200 | 3.1 |
| 91 | 0.01 | 0.55 | 0.44 | 0.00 | 22 | 140 | 440 | 1.7 |
| 92 | 0.01 | 0.55 | 0.44 | 0.10 | 20 | 300 | 400 | 1.0 |
| 93*** | 0.01 | 0.55 | 0.44 | 0.50 | 18 | 1,230 | 330 | 1.1 |
| 94 | 0.01 | 0.55 | 0.44 | 3.0 | 13 | 510 | 280 | 1.5 |

TABLE 5

$[Pb(Fe_{1/3}Nb_{2/3})O_3-PbTiO_3-PbZrO_3$ system]

| No. | Basic Composition | | | | | MnO, wt. percent | $k_r$, percent | $Q_m$ | $\epsilon$ | tan $\delta$, percent |
|---|---|---|---|---|---|---|---|---|---|---|
| | $x$ | $y$ | $z$ | $u$ | Me | | | | | |
| 1 | 0.05 | 0.46 | 0.49 | 0.02 | Ba | 0.00 | 69 | 90 | 1,710 | 2.5 |
| 2 | 0.05 | 0.46 | 0.49 | 0.02 | Ba | 0.10 | 38 | 550 | 1,150 | 1.2 |
| 3 | 0.05 | 0.46 | 0.49 | 0.02 | Ba | 0.50 | 53 | 1,060 | 750 | 2.8 |
| 4 | 0.05 | 0.46 | 0.49 | 0.02 | Ba | 3.0 | 32 | 680 | 620 | 2.5 |
| 5 | 0.05 | 0.46 | 0.49 | 0.10 | Ba | 0.00 | 64 | 85 | 1,980 | 2.7 |
| 6 | 0.05 | 0.46 | 0.49 | 0.10 | Ba | 0.10 | 35 | 510 | 1,210 | 1.2 |
| 7 | 0.05 | 0.46 | 0.49 | 0.10 | Ba | 0.50 | 53 | 1,360 | 1,000 | 1.5 |
| 8 | 0.05 | 0.46 | 0.49 | 0.10 | Ba | 3.0 | 30 | 700 | 680 | 2.6 |
| 9 | 0.05 | 0.46 | 0.49 | 0.25 | Ba | 0.00 | 33 | 75 | 3,970 | 2.9 |
| 10 | 0.05 | 0.46 | 0.49 | 0.25 | Ba | 0.10 | 30 | 530 | 3,260 | 1.5 |
| 11 | 0.05 | 0.46 | 0.49 | 0.25 | Ba | 0.50 | 31 | 1,410 | 2,810 | 1.9 |
| 12 | 0.05 | 0.46 | 0.49 | 0.25 | Ba | 3.0 | 20 | 730 | 2,500 | 2.8 |
| 13 | 0.05 | 0.46 | 0.49 | 0.01 | Sr | 0.00 | 68 | 90 | 1,705 | 2.5 |
| 14 | 0.05 | 0.46 | 0.49 | 0.01 | Sr | 0.10 | 39 | 520 | 1,160 | 1.3 |
| 15 | 0.05 | 0.46 | 0.49 | 0.01 | Sr | 0.50 | 54 | 1,390 | 980 | 1.7 |
| 16 | 0.05 | 0.46 | 0.49 | 0.01 | Sr | 3.0 | 32 | 690 | 650 | 2.4 |
| 17 | 0.05 | 0.46 | 0.49 | 0.01 | Ca | 0.00 | 67 | 90 | 1,720 | 2.5 |
| 18 | 0.05 | 0.46 | 0.49 | 0.01 | Ca | 0.10 | 36 | 500 | 1,150 | 1.2 |
| 19 | 0.05 | 0.46 | 0.49 | 0.01 | Ca | 0.50 | 52 | 1,600 | 900 | 1.6 |
| 20 | 0.05 | 0.46 | 0.49 | 0.10 | Ca | 3.0 | 30 | 820 | 630 | 2.3 |
| 21 | 0.05 | 0.44 | 0.51 | 0.05 | Ca | 0.00 | 64 | 85 | 2,020 | 2.7 |
| 22 | 0.05 | 0.44 | 0.51 | 0.05 | Ca | 0.10 | 35 | 480 | 1,220 | 1.2 |
| 23 | 0.05 | 0.44 | 0.51 | 0.05 | Ca | 0.50 | 50 | 1,280 | 960 | 1.5 |
| 24 | 0.05 | 0.44 | 0.51 | 0.05 | Ca | 3.0 | 28 | 580 | 610 | 2.6 |
| 25 | 0.05 | 0.43 | 0.52 | 0.10 | Sr | 0.00 | 66 | 80 | 2,650 | 2.8 |
| 26 | 0.05 | 0.43 | 0.52 | 0.10 | Sr | 0.10 | 35 | 520 | 2,260 | 1.8 |
| 27 | 0.05 | 0.43 | 0.52 | 0.10 | Sr | 0.50 | 52 | 1,210 | 1,930 | 1.5 |
| 28 | 0.05 | 0.43 | 0.52 | 0.10 | Sr | 3.0 | 32 | 620 | 1,620 | 2.6 |
| 29 | 0.05 | 0.40 | 0.55 | 0.20 | Sr | 0.00 | 52 | 75 | 3,890 | 3.0 |
| 30 | 0.05 | 0.40 | 0.55 | 0.20 | Sr | 0.10 | 30 | 580 | 3,380 | 1.8 |
| 31 | 0.05 | 0.40 | 0.55 | 0.20 | Sr | 0.50 | 46 | 1,550 | 1,960 | 1.5 |
| 32 | 0.05 | 0.40 | 0.55 | 0.20 | Sr | 3.0 | 23 | 690 | 1,660 | 2.9 |

TABLE 6

$[Pb(Fe_{1/3}Sb_{2/3})O_3-PbTiO_3-PbZrO_3$ system]

| No. | Basic Composition | | | | | MnO, wt. percent | $k_r$, percent | $Q_m$ | $\epsilon$ | tan $\delta$, percent |
|---|---|---|---|---|---|---|---|---|---|---|
| | $x$ | $y$ | $z$ | $u$ | Me | | | | | |
| 1 | 0.02 | 0.47 | 0.51 | 0.10 | Ba | 0.00 | 61 | 120 | 1,620 | 3.8 |
| 2 | 0.02 | 0.47 | 0.51 | 0.10 | Ba | 0.10 | 55 | 520 | 1,130 | 1.6 |
| 3 | 0.02 | 0.47 | 0.51 | 0.10 | Ba | 0.50 | 57 | 1,210 | 690 | 1.8 |
| 4 | 0.02 | 0.47 | 0.51 | 0.10 | Ba | 3.0 | 42 | 430 | 510 | 2.8 |
| 5 | 0.02 | 0.47 | 0.51 | 0.10 | Sr | 0.00 | 52 | 50 | 1,420 | 3.5 |
| 6 | 0.20 | 0.47 | 0.51 | 0.10 | Sr | 0.10 | 46 | 560 | 1,030 | 1.2 |
| 7 | 0.02 | 0.47 | 0.51 | 0.10 | Sr | 0.50 | 47 | 1,300 | 560 | 1.8 |
| 8 | 0.02 | 0.47 | 0.51 | 0.10 | Sr | 3.0 | 39 | 410 | 440 | 2.6 |
| 9 | 0.05 | 0.46 | 0.49 | 0.02 | Ba | 0.00 | 78 | 95 | 1,370 | 2.6 |
| 10 | 0.05 | 0.46 | 0.49 | 0.02 | Ba | 0.10 | 57 | 490 | 750 | 1.3 |
| 11 | 0.05 | 0.46 | 0.49 | 0.02 | Ba | 0.50 | 60 | 1,050 | 670 | 1.9 |
| 12 | 0.05 | 0.46 | 0.49 | 0.02 | Ba | 3.0 | 35 | 390 | 520 | 2.6 |
| 13 | 0.05 | 0.46 | 0.49 | 0.10 | Ba | 0.00 | 74 | 90 | 1,680 | 2.6 |
| 14 | 0.05 | 0.46 | 0.49 | 0.10 | Ba | 0.10 | 53 | 510 | 1,200 | 1.4 |
| 15 | 0.05 | 0.46 | 0.49 | 0.10 | Ba | 0.50 | 58 | 1,120 | 790 | 1.9 |
| 16 | 0.05 | 0.46 | 0.49 | 0.10 | Ba | 3.0 | 31 | 430 | 620 | 2.5 |
| 17 | 0.05 | 0.46 | 0.49 | 0.25 | Ba | 0.00 | 38 | 70 | 3,560 | 2.8 |
| 18 | 0.05 | 0.46 | 0.49 | 0.25 | Ba | 0.00 | 41 | 400 | 3,050 | 1.3 |
| 19 | 0.05 | 0.46 | 0.49 | 0.25 | Ba | 0.50 | 42 | 1,260 | 2,660 | 1.8 |
| 20 | 0.05 | 0.46 | 0.49 | 0.25 | Ba | 3.0 | 29 | 420 | 2,380 | 2.6 |
| 21 | 0.05 | 0.46 | 0.49 | 0.01 | Sr | 0.00 | 77 | 0 | 1,360 | 2.6 |
| 22 | 0.05 | 0.46 | 0.49 | 0.01 | Sr | 0.10 | 58 | 460 | 930 | 1.3 |
| 23 | 0.50 | 0.46 | 0.49 | 0.01 | Sr | 0.50 | 62 | 1,110 | 650 | 2.0 |
| 24 | 0.05 | 0.46 | 0.49 | 0.01 | Sr | 3.0 | 37 | 420 | 510 | 2.6 |

TABLE 7

| No. | Mol ratio of composition | | $k_r$, percent | $Q_m$ | $\epsilon$ | tan δ, percent |
|---|---|---|---|---|---|---|
| | PbTiO₃ | PbZrO₃ | | | | |
| 1 | 0.70 | 0.30 | | | 340 | 5.7 |
| 2 | 0.60 | 0.40 | | | 300 | 2.4 |
| 3 | 0.55 | 0.45 | 8 | 30 | 350 | 1.3 |
| 4 | 0.48 | 0.52 | 42 | 250 | 1,060 | 1.6 |
| 5 | 0.45 | 0.55 | 38 | 290 | 640 | 3.0 |
| 6 | 0.40 | 0.60 | 30 | 320 | 460 | 3.1 |
| 7 | 0.30 | 0.70 | 24 | 380 | 380 | 3.3 |
| 8 | 0.20 | 0.80 | 15 | 470 | 350 | 3.3 |
| 9 | 0.10 | 0.90 | 10 | 580 | 280 | 3.4 |

NOTE.—For the specimens Nos. 1 and 2, the evaluation of piezoelectric activities was not obtainable.

What is claimed is:

1. A piezoelectric ceramic consisting essentially of a composition which is represented by the formula:

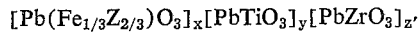

$$[Pb(Fe_{1/3}Z_{2/3})O_3]_x[PbTiO_3]_y[PbZrO_3]_z.$$

wherein $x$, $y$ and $z$ represent a set of mol ratios and $x+y+z=1.00$, wherein Z represents one element selected from the group consisting of Nb and Sb, and wherein the composition falls within the area

A–B–C–D–E–F–G–H–I of FIG. 1 where Nb is selected for Z and within the area J–K–L–M–N–O of FIG. 4 where Sb is selected for Z, the sets of mol ratios of the vertices of said area being as follows:

| | $x$ | $y$ | $z$ |
|---|---|---|---|
| A | 0.01 | 0.55 | 0.44 |
| B | 0.01 | 0.90 | 0.09 |
| C | 0.10 | 0.00 | 0.90 |
| D | 0.40 | 0.00 | 0.60 |
| E | 0.50 | 0.01 | 0.40 |
| F | 0.50 | 0.30 | 0.20 |
| G | 0.20 | 0.65 | 0.15 |
| H | 0.10 | 0.75 | 0.15 |
| I | 0.05 | 0.75 | 0.20 |
| J | 0.01 | 0.55 | 0.44 |
| K | 0.01 | 0.09 | 0.09 |
| L | 0.10 | 0.00 | 0.90 |
| M | 0.40 | 0.00 | 0.60 |
| N | 0.40 | 0.40 | 0.20 |
| O | 0.05 | 0.75 | 02.0 |

2. The piezoelectric ceramic of claim 1, wherein manganese oxide is incorporated in an amount of about 0.10 to 3.0 weight percent in the form of MnO.

3. The piezoelectric ceramic of claim 1, wherein up to about 25 atom percent of Pb is replaced by at least one element selected from the group consisting of Ba, Sr and Ca.

4. The piezoelectric ceramic of claim 1, wherein Z is Nb, and wherein the composition falls within the area A–B–C–D–E–F–G–H–I of FIG. 1, the set of mol ratios of the vertices of said area being as follows:

| | $x$ | $y$ | $z$ |
|---|---|---|---|
| A | 0.01 | 0.55 | 0.44 |
| B | 0.01 | 0.09 | 0.90 |
| C | 0.10 | 0.00 | 0.90 |
| D | 0.40 | 0.00 | 0.60 |
| E | 0.50 | 0.10 | 0.40 |
| F | 0.50 | 0.30 | 0.20 |
| G | 0.20 | 0.65 | 0.15 |
| H | 0.10 | 0.75 | 0.15 |
| I | 0.05 | 0.75 | 0.20 |

5. The piezoelectric ceramic of claim 4, wherein manganese oxide is incorporated in an amount of about 0.10 to 3.09 weight percent in the form of MnO.

6. The piezoelectric ceramic of claim 4, wherein up to about 25 atom percent of Pb is replaced by at least one element selected from the group consisting of Ba, Sr and Ca.

7. The piezoelectric ceramic of claim 1, wherein Z is Sb, and wherein the composition falls within the area of J–K–L–M–N–O of FIG. 4, the set of mol ratios of the vertices of said area being as follows:

| | $x$ | $y$ | $z$ |
|---|---|---|---|
| J | 0.01 | 0.55 | 0.44 |
| K | 0.01 | 0.09 | 0.90 |
| L | 0.10 | 0.00 | 0.90 |
| M | 0.40 | 0.00 | 0.60 |
| N | 0.40 | 0.40 | 0.20 |
| O | 0.05 | 0.75 | 0.20 |

8. The piezoelectric ceramic of claim 7, wherein manganese oxide is incorporated in an amount of about 0.10 to 3.0 weight percent in the form of MnO.

9. The piezoelectric ceramic of claim 7, wherein up to about 25 atom percent of Pb is replaced by at least one element selected from the group consisting of Ba, Sr and Ca.

References Cited

UNITED STATES PATENTS 3,403,103  9/1968  Ouchi et al. _____ 252—62.9
3,425,944  2/1969  Ouchi et al. _____ 252—62.9

TOBIAS LEVOW, Primary Examiner

J. COOPER, Assistant Examiner

U.S. Cl. X.R.

106—39